Figure 5:
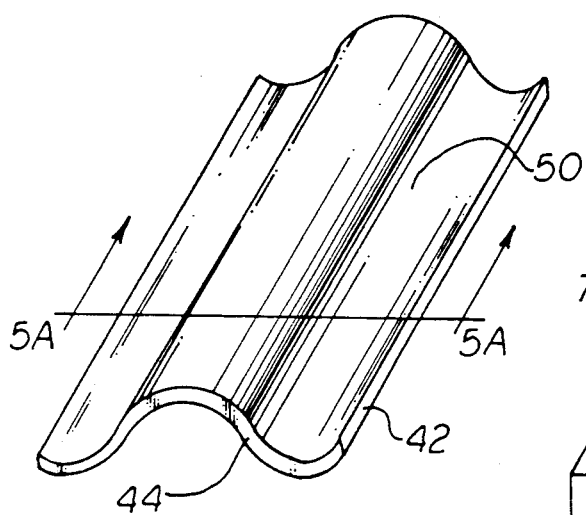

United States Patent [19]
Jonas

[11] Patent Number: 5,053,274
[45] Date of Patent: Oct. 1, 1991

[54] HIGHLY FILLED SUBSTANTIALLY SOLID POLYURETHANE, UREA AND ISOCYANNURATE COMPOSITES FOR INDOOR AND OUTDOOR APPLICATIONS, FOR LOAD BEARING, STRUCTURAL AND DECORATIVE PRODUCTS

[76] Inventor: Arthur E. Jonas, 3 Laurelwood Dr., Milford, Ohio 45150

[21] Appl. No.: 476,807

[22] Filed: Feb. 8, 1990

[51] Int. Cl.$^5$ .............................................. B32B 27/40
[52] U.S. Cl. .................. 428/332; 428/422.8; 428/423.1
[58] Field of Search ............... 428/423.1, 304.4, 422.8, 428/332, 220; 264/DIG. 77; 528/77; 524/839, 840, 789, 702, 703

[56] References Cited

U.S. PATENT DOCUMENTS

| | | | |
|---|---|---|---|
| 2,951,002 | 8/1960 | Rubenstein | 154/45.9 |
| 3,150,032 | 9/1964 | Rubenstein | 161/161 |
| 3,644,168 | 2/1972 | Bonk et al. | 428/422.8 |
| 3,933,727 | 1/1976 | Schmidt | 524/789 |
| 4,359,550 | 11/1982 | Narayan et al. | 524/589 |
| 4,433,070 | 2/1984 | Ross et al. | 523/171 |
| 4,680,214 | 7/1987 | Frish et al. | 428/107 |
| 4,740,577 | 4/1988 | DeVoe et al. | 528/51 |
| 4,804,569 | 2/1989 | Arisawa | 428/47 |
| 4,812,356 | 3/1989 | Meyer et al. | 428/423.1 |
| 4,826,944 | 5/1989 | Hoefer et al. | 528/49 |
| 4,843,105 | 6/1989 | Reischl et al. | 524/702 |
| 4,898,776 | 2/1990 | Israel et al. | 524/702 |

Primary Examiner—Merrell C. Cashion, Jr.
Attorney, Agent, or Firm—Christopher John Rudy

[57] ABSTRACT

A composite comprises a mixture of a solid polyuretahne, polyisocyanurate and/or polyurea binder with a preponderance of a solid or liquid filler. The composite may be used indoors and outdoors, for load bearing, structural and decorative products.

16 Claims, 3 Drawing Sheets

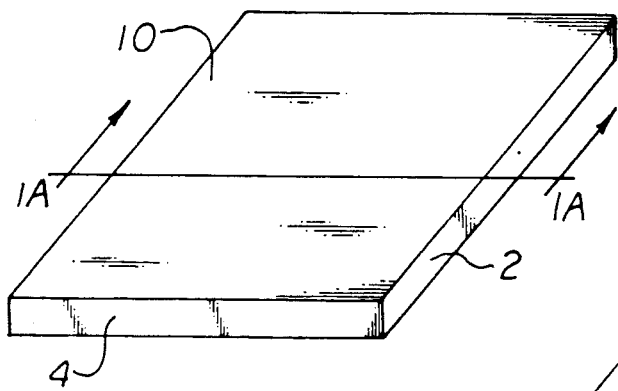
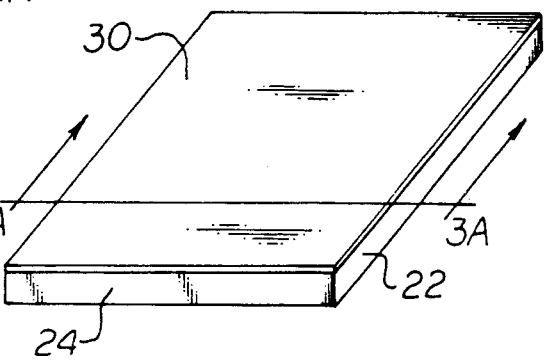
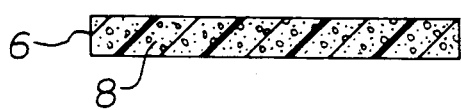
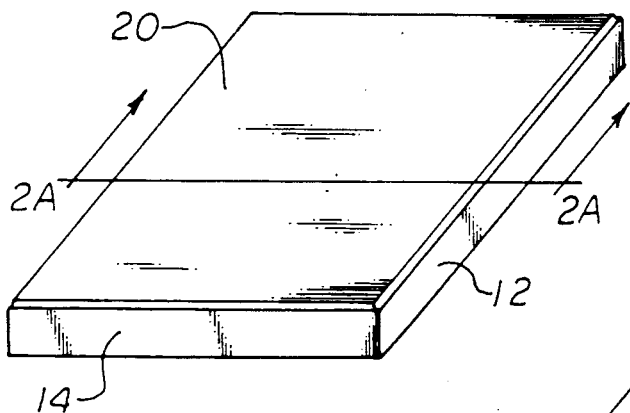
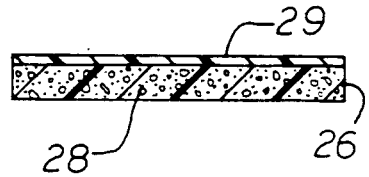
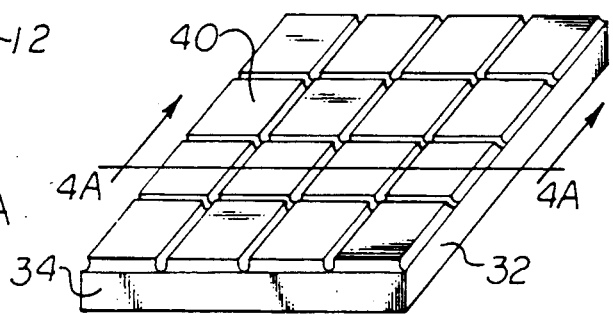
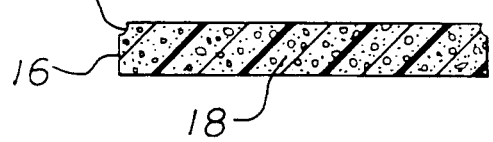
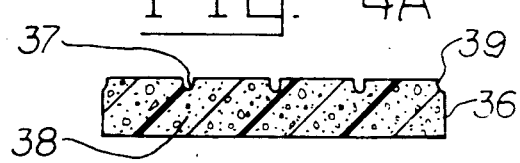

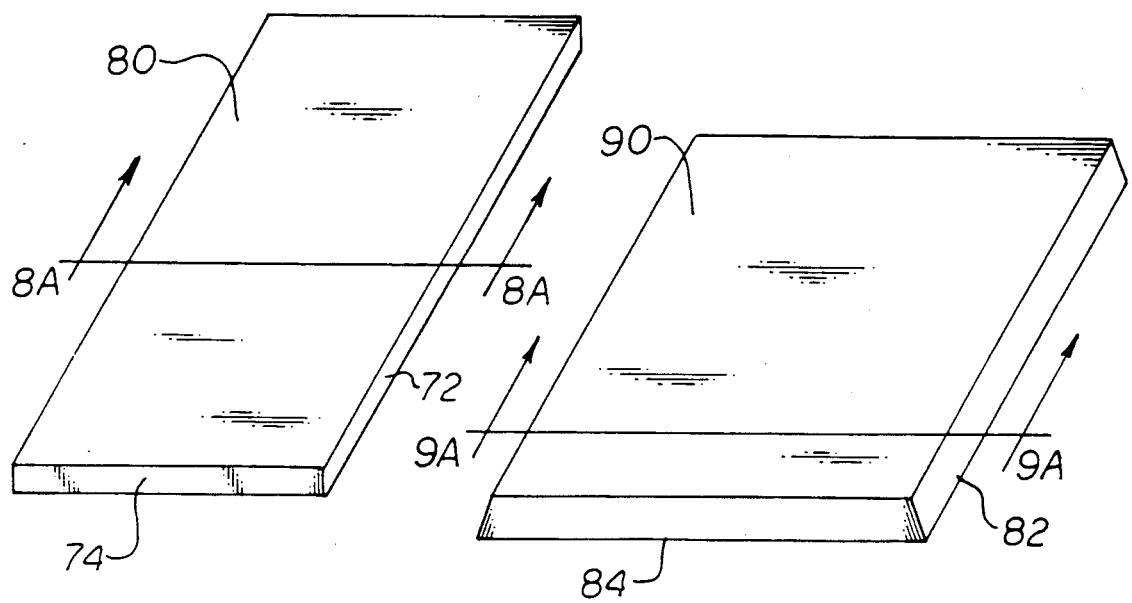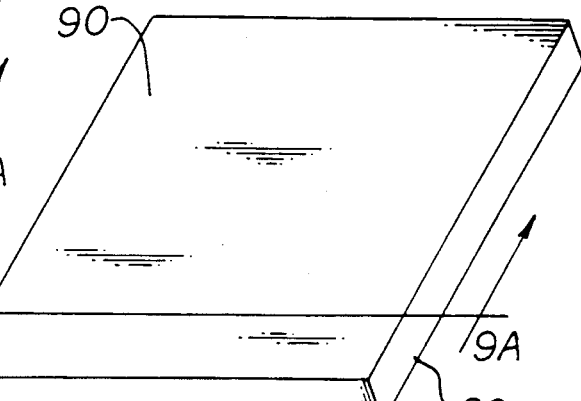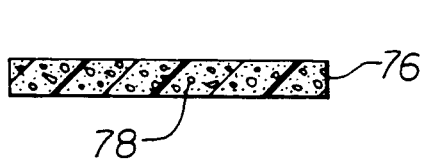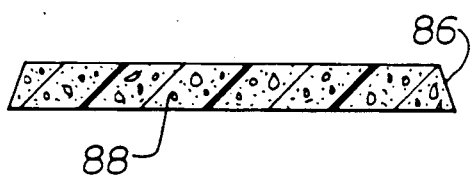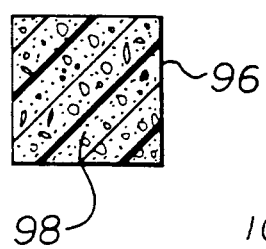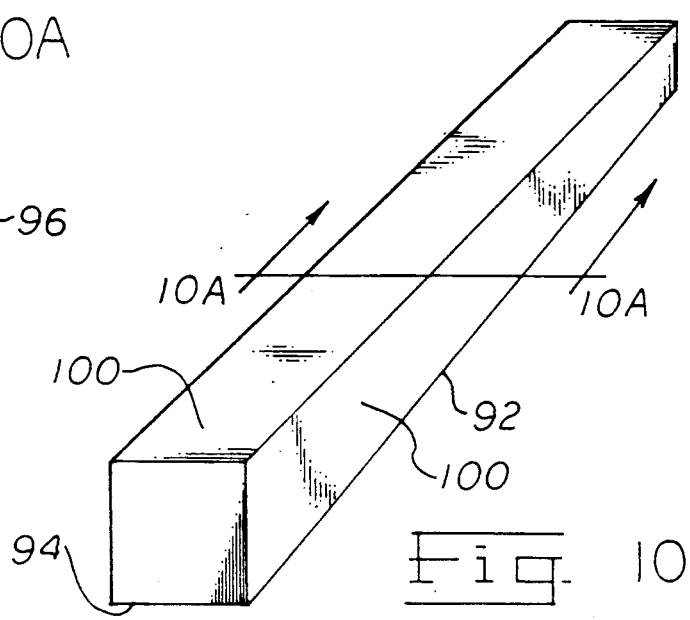

HIGHLY FILLED SUBSTANTIALLY SOLID POLYURETHANE, UREA AND ISOCYANNURATE COMPOSITES FOR INDOOR AND OUTDOOR APPLICATIONS, FOR LOAD BEARING, STRUCTURAL AND DECORATIVE PRODUCTS

FIELD

This invention relates to essentially non-blown polyurethane type compositions, such as polyurethane, polyurea and/or polyisocyanurate, with solid or liquid fillers. The compositions are generally useful for structural and decorative applications.

BACKGROUND

I. Overview of Polyurethane Type Polymers

Polyurethanes and polyureas are polymers formed by the chemical combination of a resin blend and isocyanates. Polyisocyanurates are similar polymers but are formed with a large excess of isocyanates. The resin blend may contain one or several functional organic species, which contain a minimum of two hydroxyl or amine groups per molecule. The size of these functional species may vary from monomeric, e.g., ethylene glycol or carbonyl diamine, to very large species with molecular weights of about 6000 grams per mole. The larger species may be started from polyalcohols or carboxylic diacids and grown, respectively, via polyether or polyester chain extension. Alternatively, a larger molecule may also be started from a carboxylic diacid and grown via polyether chain extensions. The final functional groups may be hydroxyl or amine and may be positioned on the terminal or secondary carbons. In addition to these functional molecules, the resin blend may also contain colorants, organic dyes or mineral pigments, and catalysts, Lewis acids including amines, metal salts and organo metallic compounds, and additives, to control leveling, sheen, flow, wet out, adhesion and moisture level.

The hardener side may be equally complex. It consists of organic species containing two or more reactive isocyanate groups per molecule. These may vary in size from simple monomers to higher homologues and may be generically of the classes called aromatic, aliphatic or pseudo-aliphatic compounds. Aromatic isocyanates are of a type, which, when reacted to make a polyurethane, will discolor under the effect of ultraviolet radiation while the aliphatic isocyanates are inherently more light stable. Pseudo-aliphatic isocyanates are aromatic species which incorporate within the molecular structure electron delocalizing subgroups which reduce the sensitivity of the molecule to photo-induced color changes.

There is an overriding characteristic of polyurethane type chemistry, to wit: If there is any moisture, water, present, the isocyanate will preferentially react with this moisture to generate carbon dioxide gas. This gas becomes entrapped within the polymerizing mixture, forming a foam. Due to the historic difficulty of removing moisture, this natural tendency for foam development was exploited and augmented with additional water and or other volatilizing agents. Hence, urethanes became the polymer of choice for manufacturing cellular plastics.

The historic method for making a non-cellular urethane type polymer involves a "two shot" approach where the polymer is premade to a 50 to 90% completion under very controlled conditions at a chemical plant. The value of this approach is that the majority of the isocyanate groups have already been reacted with a resin and are simply no longer available for subsequent water reaction. The disadvantage of this method is that the prepolymer formed is extremely viscous and can only be used when highly diluted with solvents. This approach is useful only for thin films and coatings; otherwise, the solvent becomes entrapped and generates bubbles.

Thus, historically, urethane technology has only been developed for foams or thin coatings.

II. Overview of Cementitious, Clay, Ceramic, Slate and Wood Articles

Ceramic, clay, slate and cementitious articles are essentially inorganic polymers. These article compositions and their manufacturing methods have been known for centuries. As a class, these articles are heavy, fragile and porous. The porosity causes a lack of stain resistance and a tendency to absorb moisture. When subjected to outdoor freeze/thaw conditions, the porosity and fragility characteristics together result in cracking and crumbling. Glazing or overcoating may be employed to reduce the porosity but is an added cost factor and causes extreme and dangerous slipperiness, especially in wet conditions. Even though the raw materials required to make these articles are relatively inexpensive, these articles are enormously expensive due to the extreme costs of process energy, shipping, breakage, installation and replacement.

Wood is essentially a natural polymer and as such has a great affinity for moisture. Unless it is protected from the elements, wood is prone to warpage, mold, rot and decay. In addition, wood is very combustible. The apparent advantage of this material is its relative abundance, but articles made of wood are not cost effective due to its lack of durability.

III. Disadvantages of Traditional Products and Processes

Ceramic and clay tiles and other cementitious products are very heavy, which necessitates excessive shipping costs. They are also very brittle which results in high breakage during transportation and installation. The high brittleness also necessitates extreme care in sub-surface preparation, and, due to structural settling, vibration, and movement, generally limits their usage to first and sometimes second story elevations. In addition, these products have limited repairability when damaged; they are very noisy when walked upon, and they are quite slippery, and dangerously so when wet. Due to their enormous capacity for absorbing heat, these products are very cold to the touch when used indoors and can become uncomfortably hot when used outdoors with exposure to sunlight. Finally, the required installation care and the slow curing, i.e., drying, of the cementitious glues and caulks result in high installation costs. While the basic raw materials are inexpensive, the manufacturing process is slow, requiring a large number of molds, and is energy intensive. It requires a lengthy high temperature bake in a kiln and a very slow and controlled cool down to minimize warpage distortion and cracking.

Clay containers for planters, etc., are heavy and fragile; this results in high shipping costs and high breakage. They are also porous which results in poor weathering and long term aging properties.

There are three types of roofing, clay tile, slate, and cedar shake, which could have enormous appeal if some extreme problems could be overcome. Clay tile roofs and slate roofs are extremely heavy and fragile. They are subject to the mentioned shipping, breakage, installation and weathering problems. Slate is an expensive quarried product. When these items are used in roofing, reinforced foundations, walls and roof joists are required to compensate for the extreme weight. In addition, more highly skilled labor is required for the installation, and more labor is required to lift the heavy products to the roof. Both of these articles suffer extreme damage under freeze/thaw cycles and require continuing repair and replacement. Cedar shake roofing does not suffer these disadvantages. The major disadvantage of this medium is its extreme flammability, which makes building insurance prohibitive, and it also has very irregular dimensions and a propensity to crack along its grain lines, which impedes its installation and decreases its long term durability.

Cast concrete stepping stones and floral bed dividers are heavy, fragile and are prone to chipping and freeze/thaw cracking and crumbling. Railroad ties and landscape timbers weather very well but are extremely heavy and costly due to the chemical preservative with which they are saturated.

Carved and fabricated wooden signs have an esthetic value, particularly in public parks. They have very poor weathering ability and are prone to mold, rot and decay.

IV. Review of the Prior Art

Due to the inherent disadvantages of these natural raw materials, inventors have introduced composite technologies which utilize a mixture of polymers and other ingredients, synthetic and natural, to enhance their properties. These inventions can be generalized into two categories, non-foam non-urethane technologies, and foamed urethane technologies.

The primary disadvantage of the former category is that such non-urethane polymers tend to be extremely brittle. To compensate for the brittleness, either a fibrous or mat reinforcement is added to increase cohesiveness, or a plasticizer is added to increase flexibility. The only noted advantage of non-urethane thermoset polymers is that these reagents do not react with moisture and thus do not generate carbon dioxide bubbles within the matrix.

For example, the following is noted.

Rubenstein, U.S. Pat. No. 2,951,001 (1960), describes a process for securing a thin translucent, pelluid, polyester layer onto a cementitious block. To reduce the brittleness of the polyester, Rubenstein uses fiberglass mats, steel wires and other fibers as reinforcing agents. He teaches a complex multistep approach wherein a very thin surface layer of pelluid polyester resin is placed into a mold after which is carefully inserted the first layer of reinforcing mat. This combination is then dried in the mold to a semi-hard state. A pre-made body resin, which may contain various fillers, is now cast into the mold and allowed to de-aerate for a lengthy period of time until entrapped air bubbles have substantially disappeared. After this, another reinforcing mat layer is fitted onto the body resin and allowed to settle into the body resin; normally about one hour is required. Finally, a cementitious block, which has been previously prepared by grinding the surfaces and by pre-drying in a kiln, is carefully placed into the mold on top of the body resin. This cementitious block is then placed under pressure to force migration of the resin into its pores in order to achieve better bonding. Lastly, the entire ensemble is oven cured.

Rubenstein, U.S. Pat. No. 3,150,032 (1964), differs from Rubenstein '002 only to the extent that it teaches the utilization of prestressed cementitious supporting structures.

It is readily obvious that these two patents were too complex and labor intensive to be economically viable. It is also obvious that the teaching of these patents must use a pre-made concrete base to achieve structural support. The multilayer polymer/mat filler is not self-supporting and is only decorative in nature.

Ross et al., U.S. Pat. No. 4,433,070 (1984), teaches a method for using polyester resins to make "polishable," decorative, nonstructural molded articles which can simulate onyx, marble and like mineral products. Ross et al. teaches a method which incorporates a discontinuous cosmetic filler in the polyester resin in order to achieve the mineral like appearance. But the filler must be essentially of the same composition as the resin in order to be polishable. This is a multi-step approach wherein the filler is an expensive polymer which must be pre-made to a hardness which has been predetermined to match that of the resin in the final article. This filler material will be of the same polymer composition as the final article but may incorporate different colors for cosmetic reasons. The filler must be pre-made, cured, ground and pulverized to a suitable size. The filler is then mixed into the body resin which will be cast and cured as a "polishable" article. The article will be polishable because both the filler and the resin matrix are of the same composition and hardness. It is obvious that the teachings of Ross et al. are not cost effective due to the need to pre-make a costly polymer which must subsequently be ground and pulverized so that it can become a small, solid ingredient, filler, in the final product. It is also obvious that the teaching of this patent does not use low cost fillers and that it is directed only to decorative and non-structural articles.

De Voe et al., U.S. Pat No. 4,740,577 (1988), teaches a method for making an ultra-violet (UV) curable polyurethane coating for furniture, floor tiles, graphic arts and electronic articles. De Voe et al. describes a solvent diluted system which can be applied as a thin film, less than ⅛-inch, then dried, pre-cured and finally fully cured with radiated energy. The irradiation can be blocked with suitable screens to achieve a pattern of fully cured and uncured polyurethane. The uncured polyurethane can be subsequently removed by washing with solvent. Since UV radiation is readily absorbed by solid matter, the ability to achieve a photo-induced cure is absolutely limited to thin films with a minimal filler level. It is obvious that DeVoe et al. is only teaching a method of applying a glaze coating over a pre-made article. The chemistry involved in making a UV-curable polyurethane is essentially that of making a low energy "blocked" pre-polymer. From a manufacturing viewpoint, this procedure is not cost effective and is limited to thin film applications. These films cannot utilize solid fillers since these fillers would absorb UV radiation and interfere with the cure.

Aresawa, U.S. Pat. No. 4,804,569 (1989), teaches a method for attaching a very soft wall tile or a multitude of such to the front side of a double sided pressure sensitive adhesive film. The back side of this film is covered with a protective release paper. The paper is to be removed prior to attaching the unit tile of member tiles to a pre-cleaned wall surface. The ensemble must be soft enough to be cut with scissors or a knife so that it can be fitted around protrusions from the wall, e.g., a faucet. Arisawa states that the sheet member of the substrate may preferably be made of a foamed or non-foamed flexible synthetic resinous material such as soft vinyl chloride resin, acrylic rubber, urethane resin, etc. The fact that the substrate is soft enough to be cut with a pair of scissors dictates that Aresawa's material cannot be structural but only decorative and therefore usable only for non-wear surfacing. In order to be so easily cut, the material cannot contain hard, durable fillers or polymers. It is obvious that Aresawa's teaching is limited to indoor wall surfacing applications of a strictly decorative nature and that it must utilize a double-sided adhesive backing.

Regarding the latter category, as discussed previously, polyurethanes possess a natural tendency to foam, and this characteristic has been developed and enhanced over the years. There are two main reasons for foaming polyurethanes. First, polyurethanes are a relatively expensive polymer, and foaming offers a way of reducing cost per unit volume. Secondly, the foamed polymer, because of the multitude of tiny bubbles within the body of the polymer, is an extremely efficient thermal insulation and is a material with bouancy.

Foamed polyurethane is often manufactured into large insulation sheets, e.g., 4 feet by 8 feet, called board stock. Lower densities, i.e., from more foaming, increase the insulating efficiency but promote an even greater reduction in structural physical properties. Hence, attempts have been made to increase the physical properties of polyurethane foam by incorporating structural enhancers.

For example, the following is noted.

Frish et al., U.S. Pat. No. 4,680,214 (1987), teaches a way to make relatively low density, 25 to 45 pounds per cubic foot, polyurethane board stock more structural. This method incorporates the use of longitudinal fiberglass strands at the surface of the polymer to achieve a board with greater structural strength. While this approach may have value as a reinforced sheeting stock for a roof overlayment, or wall board, it does not and was not intended to possess sufficient point of impact strength to be a flooring surface and due to the high polymer density cannot be cost effective. Frish et al. teaches a way of combining a polyurethane foam with reinforcement strands to render the composite more structurally useful.

From this review of the prior art, it can be seen that much effort has been expended to achieve polymer/filler composites. It is also obvious that these composites are of two categories: (1) either non-foam, non-urethane and non-structural composites or (2) foamed urethanes with a minority of reinforcing materials. The former category is not only costly but virtually unusable for other than decorative applications. The latter category is not only very difficult to process without extremely expensive manufacturing equipment, but also can never be a decorative finish surface.

SOME OBJECTS

An object of the present invention is to produce thick, essentially non-cellular urethane composites.

Another object of the present invention is to achieve a cost-effective, performance-effective and cosmetic-effective solution to the problems in the art.

Another object of the present invention to is overcome the inherent disadvantages of the aforementioned polymers known in the art and to prepare the types of composite products described herein, namely, self-supporting structural articles suitable for both indoor and outdoor exposure.

Another object of the present invention to make a high load bearing structural composite utilizing a minority of essentially non-foamed polyurethane.

SUMMARY

Embodiments hereof include a rigid composite of low brittleness comprising a mixture of solid polyurethane, polyisocyanurate or polyurea binder or combinations thereof with a preponderance of dry solid or dry liquid fillers. Further, the article thereof may be blended from individual entities or from one or more pre-blends consisting of the resin, the filler and the isocyanate; it may be cast into a flexible or rigid mold and gelled into a shape of any configuration, texture and color for indoor or outdoor application; it may achieve its final cure in or out of the mold; it can vary in thickness from 3/16 inch to 16 inches, in length from 4 inches to 16 feet and in width from 0.5 inches to 8 feet; it can have a separate layer applied into the mold a pre-glaze or onto the molded article as an after-glaze, which layer may or may not be an integral part of the substrate. Yet further, a component thereof can be a resin blend of any combination of polyesters, polyethers, extenders and cross-linkers resulting in an average hydroxyl number from 200 to 400 and an average functionality from 2.0 to 4.0; a component thereof can be a single filler or a blend of different fillers of varying compositions and sizes or a blend of the same filler but of different configurations and sizes; a component thereof can be an isocyanate comprising aromatic, aliphatic or pseudo-aliphatic species or blends of such. Still further, the composition may contain one or more types of water reducing ingredients in any or all of the pre-blends; it may contain any combination of organometallic, alkaline and amine catalysts in any or all of the blends to achieve a gel time of 20 seconds to 2 hours, which catalysts may be blocked from activity until a suitable stimulus or activator is provided; it can contain none, one, or more colorant(s), which may be mineral pigments, organic dyes or mixtures thereof, and which colorant(s) may be added to any or all of the pre-blends; it may contain liquid fillers, plasticizers, ultra-violet absorbers, antioxidants, friction modifiers, abrasion enhancers and fungicides which may be added to any or all of the pre-blends. Also, the glazecoat of the separate layer may be of the same polyurethane type composition as the bulk layer, of a different polyurethane type composition or of any other polymeric composition; the glazecoat of the separate layer may contain no additives or which may contain any or all of liquid fillers, solid fillers, inorganic pigments, organic dyes, friction modifiers, ultra-violet absorbers, abrasion enhancers, and fungicides; the pre-coat of the separate layer may vary in thickness from 0.005 inches to 0.250 inches; the pre-coat of the separate layer may vary in gel time from 20 seconds to 2 hours; the pre-coat of the separate layer may achieve final cure in or out of the mold. Other embodiments of the present invention are extant.

The present invention teaches a feasible, cost effective, commercial method for achieving structural, durable composites which at the same time can be decorative and esthetically pleasing. This invention achieves a long felt but unsolved need.

Whereas prior art describes the inclusion of fillers to render the polymer stronger, the present invention teaches the usage of a polymer matrix to make the composite stronger. The difference between prior art and the present invention is the relative proportion of the ingredients and the polymer of choice for achieving the unitary matrix. This invention teaches a method of combining a plurality of inert materials with a polyurethane type polymer to achieve a composite with truly unique properties. The distinctive properties which are achieved hereby are the following:

1) Enhanced thermal insulation.
2) Enhanced shock absorbency.
3) Enhanced sound absorbency.
4) Enhanced skid resistance.
5) Enhanced fire resistance.
6) Enhanced mold resistance.
7) Enhanced rot resistance.
8) Enhanced flexibility.
9) Minimal porosity.
10) Enhanced stain resistance.
11) Lower densities.
12) High impact resistance.
13) Self supporting construction.
14) Enhanced strength properties.
15) Greater design freedom.

From a manufacturing perspective the present invention achieves lower unit costs. The following manufacturing advantages apply:

1) Faster cycle times.
2) Reduced number of molds.
3) Tremendously lower kiln temperatures.
4) Tremendously reduced cure times.
5) Reduced in-process breakage and rejects.
6) Greater design freedom, including shape, size and texture.
7) The capability of one color composition or a two color approach, i.e., a body compound with a glaze coat.

From the installation standpoint, lower costs are also realized due to the following:

1) Lower weight per unit for reduced shipping costs.
2) Higher impact resistance for reduced breakage.
3) Lower package weight for reduced job site handling cost.
4) Higher flexibility for reduced sub-surface preparation costs.
5) Greater ductility for easier nailability and reduced installation costs.

And finally, from the standpoint of an architect the benefits are the following:

1) The ability to be used in high rise constructions.
2) The achievement of thermal insulation.
3) The achievement of shock absorbency.
4) The achievement of sound absorbency.
5) The achievement of anti-skid properties.
6) Reduced flammability.
7) Increased durability.

Thus, it can be seen that the present invention teaches a new technology which has been unexplored and unconceived of in the prior art. This new technology produces unexpected and synergistic results which achieves enormous physical property improvements and which, at the same time, is commercially viable. This invention teaches a composite technology which is both superior to the existing art and commercially feasible.

DRAWINGS

FIGS. 1 & 1A show perspective and cross-sectional views of a composite unit tile of the present invention. The cross-sectional view is generally taken along the plane defined by lines 1A—1A of the perspective view. This is a typical useful embodiment of this invention. The unit has sides, length 2 and width 4, of appropriate dimensions and a surface 10 which may be textured or smooth according to design considerations. It consists of a resin and filler composition combination 8, which may be a blend of various fillers and sizes contained by a resin matrix. The thickness 6 is not limited by strength considerations and may vary according to cosmetics or cost considerations. In most cases, however, it will be desirable to maintain thicknesses according to standards which are typical of the industry.

FIGS. 2 & 2A show perspective and cross-sectional views of composite unit tiles with grout edges of the present along the plane defined by lines 2A—2A of the perspective view. Such a useful embodiment of this invention may be utilized singly or in any combination. The shape as defined by sides 12 & 14 may be regular geometric as shown or irregular, i.e., non-geometric. The depth 16 is variable, and in some instances it may be desirable to use a pre-formed grout line or indented border 17 so that tiles may be abutted close to each other but with space remaining for grouting. A pre-formed edge line is not possible with pertinent compositions of the prior art due to the brittleness and lack of chip resistance of cementitious materials. The surface 20 can be uniquely textured as desired. The resin matrix components and/or size of the fillers in the composition 18 may vary, if desired, from top to bottom.

FIGS. 3 & 3A show perspective and cross-sectional views of composite unit tile with glaze coat. The cross-sectional view is generally taken along the plane defined by lines 3A—3A of the perspective view. This embodiment has a surface glaze coat 29 & 30 which may be different from the base composition 28. The surface glaze coat may be a different polymer or the same polymer with property modifiers. These modifiers may be, but are not limited to, friction enhancers, ultra-violet absorbers, abrasion resistant enhancers and chemical and stain resistant enhancers. These additives may be solids or liquids, inorganic or polymeric in nature and may be tightly or loosely contained in the surface. Also, this glaze coat may be of essentially the same composition as the bulk layer, the substrate, but in different proportions. Lastly, the surface may be of a different color from the substrate or it may be uncolored or slightly tinted and translucent in order to achieve enhanced depth. A translucent layer for depth enhancement is a technique which is not available with traditional cementitious compositions. The sides 22 & 24 and the thickness 26, not limited by the teachings of this invention, may be varied according to application and design considerations.

FIGS. 4 & 4A show perspective and cross-sectional views of a multi-unit composite tile panel with grout edges. The cross-sectional view is generally taken along the plane defined by lines 4A—4A of the perspective view. This embodiment illustrates the incorporation of a multi-tile design. This type of panel cannot be utilized with traditional cementitious compositions because such other compositions are too rigid and brittle to be self-supporting over a large area. The composition of this invention, however, yields an article which has sufficient strength and flexibility to allow the panel to conform to small irregularities in the sub-surface without cracking. The economic impact of a multi-unit panel is a tremendous reduction in installation costs while preserving the appearance of individually layed tiles. The panel composition 38 has length 32 and width 34, and it may be of any convenient size, for example, 8 feet by 4 feet. The thickness 36 is also variable as desired. The number of individual tile simulations can be adjusted according to the overall design. Here are shown 16 individual sections. Grout depressions are used to divide these sections. Normal grout line widths 37 are cast into the interior of the panel and half widths 39 are used on the exterior so that when panels are abutted one to another a full width grout is achieved at the abutment. The grout depression will be deep enough to be grouted in the normal fashion. This procedure will mask the panel edges and will achieve authenticity in appearance. The panel composition and construction can be any of those taught by this invention and the surface 40 may be smooth or textured as desired. Thus illustrated is a labor saving multi-unit panel. These panels with suitable design modifications may be utilized for flooring, walls, ceilings, roofing and other outdoor applications.

Figure 5A:
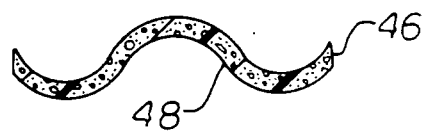

FIGS. 5 & 5A show perspective and cross-sectional views of a composite Spanish roofing tile of the present invention. The cross-sectional view is generally taken along the plane defined by lines 5A—5A of the perspective view. The length 42, width 44 and thickness 46 may be varied as desired. The front and rear profiles may be constant as shown, or they may be different to achieve a mechanical lock mechanism to prevent slippage, to facilitate installation and/or to improve weather sealing. The edges may be constant as shown, or they may be feathered to facilitate overlapping and weather sealing. Known properly sealed roofs will be susceptible to mold, rot and premature weathering. Another noted advantage of this invention is that the feathered, lapped and irregularly shaped contours may be molded into the product. These refinements are achievable since the composition 48 is not fragile as extant in the prior art. The surface 50 may be smooth or textured according to design considerations. The variability of design and application can only be achieved by the the present invention. Any shape or design is possible hereby This is not so with the traditional art, which makes products that are too brittle to allow feathered edges and complex configurations. The dimensions of the unit may be such that traditional styling can be maintained or they may be changed so that more efficient manufacturing and installation can be realized. The surface, edging and profile may be varied as dictated by market needs rather than by the limitations of the composition, as is the case with the prior art.

Figure 6:
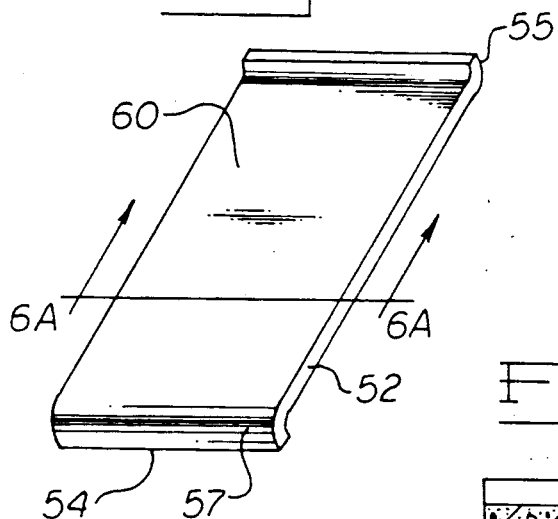
Figure 6A:
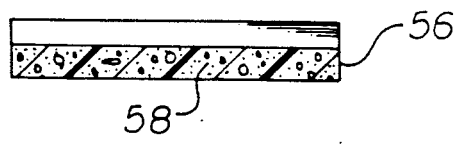

FIGS. 6 & 6A show perspective and cross-sectional views of a composite roofing unit of the present invention in imitation of cedar shake with anti-slip and rain seal the plane defined by lines 6A—6A of the perspective view. This embodiment has a real market need, namely, a non-flammable roofing material which really looks like a cedar shake roof. The composition and manufacturing methodology of this invention achieves the cedar shake style, and overcome hereby are the three most outstanding negatives of natural cedar shake roofing, its extreme combustibility, its very irregular dimensions and its propensity to crack along its grain lines. The length 52 and width 54 of the unit can be varied as desired. The rear and front dimensions can be constant as shown, or they can be varied according to design and performance considerations. This design has the anti-slip mechanical lock 55 at the rear of the unit and an improved weather seal curvature 57 at the front of the unit. These two features are not possible with the prior art. The surface 60 can be textured according to design and market considerations. The composition 58 can be any of those of the present invention.

Figure 7:
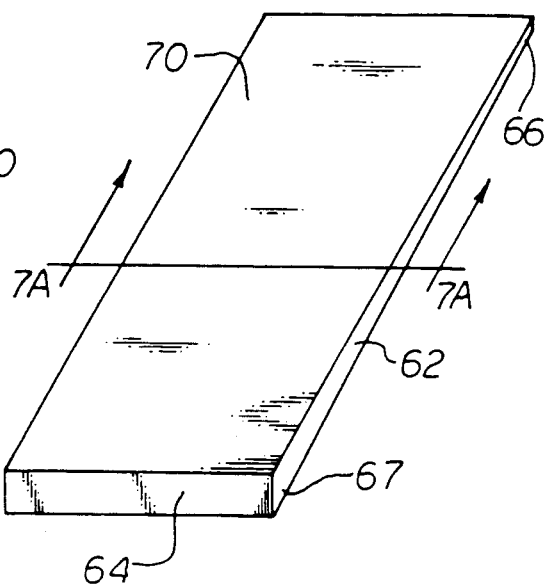
Figure 7A:
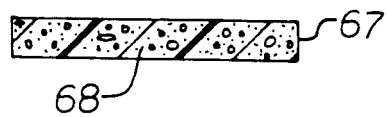

FIGS. 7 & 7A show perspective and cross-sectional views of a roofing unit of the invention in imitation of slate roofing. The cross-sectional view is generally taken along the plane defined by lines 7A—7A of the perspective view. This embodiment fills another market need, namely, a better "slate roof." This embodiment offers a more efficient, more durable and less costly alternative to the traditional state-of-the-art slate roof, and overcome hereby are three extreme negatives of traditional slate roofing, its high cost of purchase, its high cost of installation and its poor resistance to weathering, which results in slippage of individual slate panels with a loss of integrity of the roof that necessitates almost annual repairs. The length 62 and sizes or new designs. The depths or elevations, front 67 and rear 66, can be constant as in traditional slate roofs, or they can be varied as shown to achieve enhanced cosmetics and visual appearance. The surface 70 can be textured and colored according to design considerations. The composition 68 can be any of those of this invention. It is also possible to achieve a labor saving panel construction as illustrated in FIG. 4, simulating multi-slate pieces. This has obvious advantages for reducing manufacturing and installation costs while preserving the excellent slate-like appearance.

FIGS. 8 & 8A show perspective and cross-sectional views of a weather resistant polycrete unit or panel of the present invention. The cross-sectional view is generally taken along the plane defined by lines 8A—8A of the perspective view. This embodiment has tremendous need on highways, and in park and recreational areas, and it is a weather, rot and mold resistant alternative to the highly valued, decorative and esthetically appealing wood, and it, like the composition of this invention in imitation of the cedar shake roof, can be produced with less cost, i.e., molded with inexpensive raw materials, and is inherently much more durable than the wood. This embodiment might be used for highway signs, tables and benches, or any other application that can benefit from a weather resistant wood-like material. The length 72, the width 74 and the thickness 76 can be varied as required. The surface 80 can be textured or smooth as desired, and lettering or symbols, which can be raised or lowered from the surface, can be molded into the surface. The composition 78 can be any of those of the present invention.

FIGS. 9 & 9A show perspective and cross-sectional views of a weather resistant polycrete unit or panel of the present invention. The cross-sectional view is generally taken along the plane defined by lines 9A—9A of the perspective view. This embodiment, a "polycrete", a better alternative to concrete, i.e., more durable, more efficient to manufacture and lighter in weight, has utility for large surfacing and wall paneling applications. Applications may include, for example, interior and exterior walkways, stepping stones, patios and pool enclosures. Generally, outdoor applications will necessitate larger dimensions than be 4 feet by 4 feet by 4 inches for walkways and as much as 20 feet by 10 feet by 6 inches for facings or curtain panels. The length 82 and width 84 may be the same or different and may be geometric or irregular in design. The sides 86 may be perpendicular to the surface, or they may be angled as shown to improve de-molding, inlaying and appearance. Within the practice of this invention, the dimensions and configurations are not always stipulated, and they may be varied as required according to design considerations, manufacturing efficiencies, and ease of installation. The aggregates in the matrix 88 may be of any dimension and composition and may be uniformly distributed from top to bottom or may be preferentially distributed from top to bottom. The surface 90 may be smooth, textured or include a design and symbols. A design unit with greater length and width could be utilized as a decorative, structural and weather resistant facing for buildings and public works projects.

FIGS. 10 & 10A show perspective and cross-sectional views of a weather resistant variable density composition of the present invention in imitation of a landscape timber. The cross-sectional view is generally taken along the plane defined by lines 10A—10A of the perspective view. This embodiment is ideally suited for simulating decorative timbers. Such an embodiment may be quite massive in appearance, but the actual weight may be varied from very light to very heavy as desired by a suitable choice of fillers. The unique advantage of this embodiment is that while it may look like and function as a wood substitute, it does not share the negatives of wood, namely, the tendency to absorb moisture, and to rot and mildew. In addition, the choice of a non-flammable filler can render the final product to be lowly or non-combustible. Dimensions of length 92, width 94 and depth 96 may be varied as required, but typical dimensions could be as large as 10 inches by 10 by 10 feet. The width 94 may be perpendicular as shown, or it may be somewhat truncated to facilitate de-molding. The fillers in the matrix 98 may be of any size or composition, and the surface 100 may be smooth or textured according to design considerations.

DETAIL

This is a three-fold invention including composition, processing and application. Each of these categories are to be considered as separate entities and valid for this invention. An important feature of this invention is its versatility with respect to composition and production requirements. Further operation details follow.

The composition includes a polyurethane type system and a filler. The polyurethane type system consists of two liquid blends. The "resin" part of this system is a blend of many different ingredients. Most of these ingredients will be liquid at room temperature. The liquid ingredients will consist of reactive poly alcohol and non- or semi-reactive additives. The additives can be any combination of catalysts, viscosity modifiers, homogenizing agents, friction modifiers, colorants, surface tension reducers and liquid fillers. The resin may also contain ingredients which are solid at room temperature. These solid ingredients can be pigmenting agents, extenders, cross-linkers, flexibilizers, friction modifiers and/or water reducing compounds.

The "hardener" part of the system will be an isocyanate. The isocyanate can be a "chemically pure" specie or more like a blend of varying molecular weights, functionalities, isomers and types. The hardener part may also contain colorants, friction modifiers, homogenizing agents, viscosity modifiers, water absorbers, surface tension reducers, catalysts and fillers.

The composition of the "filler" part of the system will depend upon the final application. This component can be substantially solid at room temperature. It may be a blend of different ingredients of different particle sizes or a blend The fillers may be inorganic organic or mixtures thereof to the same ingredient but with different particle sizes. As shown in the examples hereof, the filler may be liquid. In addition to the such "fillers," this blend may also contain: colorants, friction modifiers, homogenizers, viscosity adjusters, wet-out agents, water absorbers and catalysts. These additives may be liquid or solid at room temperature.

The composition embodiments of this invention include all simulated cementations, mineral, clay, ceramic and cellulosic structural composites wherein a preponderance of mineral, synthetic and cellulose fillers or combinations thereof are suspended in, surrounded, supported and encapsulated by a minimal amount of polyurethane type polymer matrix. These composites in and of themselves are self-supporting and do not require additional strengthening elements such as rods, belts, glass fibers or mats and do not need to be cast upon or incorporated onto a supporting substrate.

The fillers or combinations of fillers chosen serve a fivefold function: structural enhancement, processing ease, cost reduction, improved product performance and variable cosmetics. The fillers employed may be anything from unrefined sand and gravel to highly refined fumed silica and calcined clay. The fillers chosen may also vary in specific gravity as dictated by the requirements of the final product from ultra heavy materials, such as barates and glass beads to the ultra-light, such as vermiculite, hollow glass, ceramic beads or wood flour. The fillers chosen may also vary as dictated by the performance and cosmetic requirements of the final product from minerals to large aggregates. The fillers may be particulate or fibrous in nature.

The preferred filler or combinations of filler loadings can vary from 50% to 95% of the total final weight. In most cases, the isocyanate and resin components will only be used in amounts sufficient to wet out the solids and achieve a workable, i.e., flowable, consistency.

In order to minimize the isocyanate-water reaction, it may be necessary to pre-dry all of the fillers at a time and temperature schedule which is sufficient to evaporate kiln/oven operating from 200 to 500 degrees F. and with a residence time of 30 minutes to several hours. In addition to pre-drying the fillers, it may also be necessary to add singly, or in combination, water absorbing materials such as zeolites, i.e., sodium potassium aluminum silicates, water hydrating materials, e.g., lime, or water reacting materials, i.e., mono-isocyanates, organometallics, e.g., triisopropylvanadate, or metal hydrides, e.g., aluminum hydride. This invention does not exclude the isocyanate-water water reaction, but this reaction, if it does occur, is not necessary to the invention.

The polyurethane type polymers of this invention are polyurethanes, polyisocyanurates and/or polyureas. Such form polymer matrices of the products of the invention.

The polyurethane/polyurea polymers used in this invention are reaction products of isocyanates and isocyanate-reactive components wherein the stoichiometric ratio is set, and an NCO index of 90 to 120 is present. The polyisocyanurate polymers are similarly formed except that the NCO index can be as great as 300, and the polymer formation will be co-initiated by any of those catalysts known to promote the trimerization reaction.

Some examples of useful polyurethane catalysts known to industry include triethylenediamine(1,4-diazobicyclo(2,2,2)-octane), dimethylethanolamine, 1,3,5 tri(dimethylaminopropyl)hexahydrotriazine and other tertiary amines or combinations thereof. In addition, small amounts of combinations with themselves or with tertiary amines. These types include dibutyltin dilaurate, dibutyltin diacetate, stannous octanoate, bismuth carboxylate, zinc octanoate and ferrous acetyl acetonate. Some examples of trimerization catalysts are quarternary ammonium carboxylates, 1,3,5-tris-(dimethylaminopropyl)hexahydrotriazine, potassium octanoate, potassium acetate and combinations of tertiary amines and epoxides.

The isocyanates useful for this invention may be one specie, or they may be blends of more than one type or isomer or chemical specie. In either case, the final material will generally be a low viscosity liquid at room temperature. The average viscosity can be as great as 4000 cps but preferably is less then 500 cps. The average functionality can vary as dictated by the requirements of the final product from 2.0 to 3.0. Isocyanates useful for this invention include aromatics, aromatic derivatives, e.g., carbodiimides, allophanates, etc., saturated aromatics, e.g., hydrogenated MDI, aliphatics, e.g., hexanediisocyannate, HX, and pseudoaliphatics, e.g., trimethyl xylene diisocyanate, TMXDI. These may be used singly or in combination in order to achieve the best balance of viscosity, reactivity and resistance to ultraviolet induced color change. Those isocyanates which are particularly useful are polymeric methylene diphenyl diisocyanate (polymeric MDI) and tetramethyl xylene diisocyanate (TMXDI).

The resin component may be a single polyol or a blend of polyols with or without extenders and cross-linkers. The of choice will typically have a hydroxyl number (OH#) from 26 to 400 and will vary in average functionality from 2.0 to 6.0. The chain extenders are difunctional and will vary from OH# of polyols about 500 to 2000, typically from 637 to 1810. Sometimes it will also be necessary to incorporate a chain crosslinker, for example, glycerin or trimethyolpropane, in order to achieve high tensile strength or hardness values.

It may also be necessary to use antifoam surfactants to reduce cellular formation or to induce leveling. Surfactants which have been particularly useful are Paint Additive No. 9 (Dow Corning) and Triton X-100 (Shell Chem.).

The present invention is not to be limited to the foregoing specific examples of suitable isocyanates, polyols, extenders, crosslinkers, water extractors, catalysts, or surfactants. Any of the large number of materials available from a variety of suppliers for use in polyurethane manufacture may be substituted for the specifically identified materials by one skilled in the art and fall within the teachings of this invention.

A typical process will consist of pre-blending the ingredients of the resin, the filler and the isocyanate. Each of these separate blends is stable and may be stored in suitably sealed containers, which may also be blanketed with a dry gas and stabily stored for many months. The next step in the process is to blend the filler mix into the resin blend. This also is a stable blend and may be stored for later use. The isocyanate blend is mixed into the resin/filler blend according to a predetermined ratio. This mixture of resin, filler and hardener is blended to a uniform composition and cast into the molds. The above described blending process may be done batch-wise or as a continuous process.

The molds may be of any design, shape or material. The fillers in these systems inhibit the shrinkage typical of the reactions of liquids to form solid polymers. Due to this reduced shrinkage, the manufacturing will be easier if standard tooling techniques are used. These techniques collapsible or movable sides and ejection pins. The reactive liquids and resulting polymers are very effective adhesives, and the adhesiveness increases with gel times; hence, the mold surface will need to be suitably prepared to achieve releasability after the casting material has hardened. Any release technique can be used. This can be as simple as a release coating applied to the mold surface prior to each casting. Multiple-use release coatings may also be used, which allow more than one casting to be made before having to be reapplied. More durable release coatings may be infused directly into the surface of the mold. Sometimes it is possible to utilize inherently self-releasing polymers, e.g., polypropylene or polyhalogenated polymers, as the mold and/or the mold surface. The preferred manufacturing process will utilize flexible polyurethane molds.

The bulk blend can be thought of as three separate entities: the resin, the filler and the hardener. Each of these three entities will be a blend of different ingredients. It will always be necessary to pre-blend the resin and the hardener as discrete entities. Usually it will be more expedient to pre-blend the filler also.

The manufacturing process is a step-wise procedure. The fillers are blended into the resin, either as a total entity or as separate ingredients. Next, the hardener is added and mixed to a uniform consistency. This final mix, which may be very viscous, is then cast into the molds. The molds are vibrated or tramped to achieve leveling and release of entrapped air. In order to expedite the hardening reaction process, the filled molds will normally be conveyed through a mild baking oven at 30 to 75 degrees C. for a short time of ½ an hour to 2 hours. After hardening, the cast product will be demolded, trimmed and placed into a post-cured oven of abut 70 to 90 degrees C. for 8 to 16 hours. The molds are now returned for production.

The process may be refined to utilize a surface layer, i.e., glaze coat, which has unique properties or coloration relative to the bulk matrix. This glaze coat may be sprayed or cast onto the mold as an "in-line" process. It will be catalyzed to achieve some degree of tack before the bulk blend is cast into the mold. The glaze coat can be targeted to fulfill specific objectives such UV-absorbing for roofing applications, or special visual effects for facing or wall applications. A particularly desired embodiment is an abrasion resistant surface for flooring applications. This can be achieved by utilizing essentially the same composition as is in the bulk matrix, but it must be enriched with a very hard mineral filler. The filler of choice will be alumina ($Al_2O_3$) as this substance is one of the hardest and least costly of the readily available fillers. The carbides are harder, but more costly, because these are manufactured materials.

EXAMPLES

The following examples illustrate the urethane composites of the present invention. Therein, parts and percentages are by weight unless otherwise specified or otherwise apparent from the context.

EXAMPLE SET 1

Table 1 details four resin formulations which vary in ascending order to increasing hardness and decreasing ductility. Typically these resin blends when reacted with about 10% over the stoichiometric amount of isocyanate will exhibit Shore D hardnesses from 77 to 85. The hardness can be adjusted within about plus or minus 2 points by varying the isocyanate index from 90 to 120. The adjusted reactivity of these blends can vary from 20 seconds to 2 hours in gel time.

TABLE 1

| Item | Description | #1 | #2 | #3 | #4 |
|---|---|---|---|---|---|
| A | Aromatic Polyester Polyol | 50.0 | 18.0 | 18.0 | 36.0 |
| B | Flexible Polyether Polyol | 29.0 | 40.0 | 40.0 | 19.0 |
| C | Rigid Polyether Polyol | 5.0 | 20.0 | 20.0 | 23.0 |
| D | Water Absorber | 1.0 | 1.0 | 1.0 | 1.0 |
| E | Long Chain Extender | 6.0 | 8.0 | 8.0 | 8.0 |
| F | Medium Chain Extender | 6.0 | 8.0 | 8.0 | 8.0 |
| G | Short Chain Extender | 2.0 | 4.0 | — | 4.0 |
| H | Small Crosslinker | — | — | 4.0 | — |
| I | Surface Tension Reducer | 0.1 | 0.1 | 0.1 | 0.1 |
| J | Auxiliary Surface Tension Reducer | 0.3 | 0.3 | 0.3 | 0.3 |
| K | Primary Catalyst | 0.1 | 0.1 | 0.1 | 0.1 |
| L | Secondary Catalyst | 0.5 | 0.5 | 0.5 | 0.5 |
| *Chemical Specifics* | | | | | |
| | Average Hydroxyl Number | 350.8 | 358.9 | 359.7 | 422.7 |
| | Average Equivalent Weight | 159.9 | 156.3 | 156.0 | 132.7 |
| | Average Equivalents | 0.625 | 0.640 | 0.641 | 0.754 |
| | 100 Index w/St. Poly MDI | 83.37 | 85.29 | 85.45 | 100.5 |
| | 110 Index w/St. Poly MDI | 91.71 | 93.81 | 94.00 | 110.5 |
| *Typical Polymer Properties* | | | | | |
| | Hardness (Shore D) | 77 | 81 | 83 | 85 |
| | Tensile (lbs./sq. inch) | 5200 | 5600 | 5800 | 6200 |
| | Elongation (per cent) | 50 | 40 | 35 | 20 |
| | Notched Izod Impact (pli) | 2.5 | 2.0 | 1.5 | 1.0 |
| | Heat Distortion Temp. (C.) | 50 | 60 | 62 | 70 |

The total weight parts or percents of items A-L for each of the compositions 1-4 of Table 1 is 100.00.

Aromatic polyol A can be any of the class of phthalic acid initiated difunctional polyols, which can be obtained, for example, from Hercules (Tarates), Freeman Chemical)s (Chardinols) or Stepan Chemicals (Stepanols), with OH# from 250 to 350. Polyether polyol B will typically be a trifunctional flexible polyol with an OH# number from 26 to 52. Polyether polyol C will be a difunctional hardening with an OH# number from 250 to 315. Item D can be any polyol of the known water absorbing or reducing chemicals, for example, a 3-angstrom molecular sieve from Union Carbide Corp. Extenders E, F and G are dipropylene glycol, diethylene glycol and ethylene glycol, respectively. Crosslinker H is a monomeric trifunctional specie such as glycerin or trimetholpropane. Surfactants I and J are respectively a cell opening agent, e.g., Paint Additive number 9 from Dow Corning, and a flow control agent such as Triton X-100 from Shell Chemicals. Catalyst K is a gelling organometallic specie such as dibutyltin dilaurate while catalyst L is a viscosity building specie such as diaminobicyclo octane (DABCO). Incidentally, these two types of catalysts can be used singly or in conjunction with each other in order to achieve the proper viscosity build and desired ultimate gel. The absolute levels can be varied as required to achieve the desired level of reactivity.

The sequence of manufacture is first to pre-blend the resin mix in order to achieve homogeneity of all of the reactants, surfactants, catalysts, etc. This resin blend may be used immediately or stored for subsequent usage. The water reducer may be added to the resin blend or to the composite blend or in both mixes as required.

EXAMPLE SET 2

Table 2 details six typical composite formulations, which are representative blends which may be used, respectively, to manufacture cultured ceramic tile, cultured slate articles, cultured adobe or Mexican tiles or other simulated clay articles, cultured cedar shakes and other "wood-like" articles, "Polycrete" alternatives to concrete products, and a neutral glaze, which may be pigmented if desired, and which makes an extremely hard, durable and abrasion resistant surface. The samples are tabulated in Table 2 as follows: 1) Simulated ceramic tile; 2) Simulated slate; 3) Simulated adobe tiles; 4) Simulated cedar shake shingles; 5) Polycrete; 6) Glaze.

TABLE 2

| Item | Description | #1 | #2 | #3 | #4 | #5 | #6 |
|---|---|---|---|---|---|---|---|
| M | Resin Blend 1 | — | — | — | 42.63 | — | — |
| N | Resin Blend 2 | 12.15 | 12.15 | 7.60 | — | — | — |
| O | Resin Blend 3 | — | — | — | — | 7.60 | — |
| P | Resin Blend 4 | — | — | — | — | — | 12.15 |
| Q | Water Reducer | 3.00 | 3.00 | 3.00 | 3.00 | 3.00 | 3.00 |
| R | CaSO4 | 2.30 | 6.70 | 2.00 | — | 10.00 | 3.00 |
| S | Sand | 46.00 | 52.00 | 45.90 | — | 72.24 | — |
| T | Marble Dust | 25.50 | 13.70 | 34.60 | — | — | — |
| U | Vermiculite | — | — | — | 15.27 | — | — |
| V | Alumina | — | — | — | — | — | 58.42 |
| W | Black Dye | — | 1.40 | — | — | — | — |
| X | Red Dye | — | — | .03 | — | .02 | — |
| Y | Color Stabilizers | — | — | — | — | — | 10.00 |
| Z | Polymeric MDI | 11.05 | 11.05 | 6.87 | 39.10 | 7.14 | 13.43 |
| *Weight Percent of Groups of Ingredients* | | | | | | | |
| | Resin | 12.15 | 12.15 | 7.60 | 42.63 | 7.60 | 12.15 |
| | Isocyanate | 11.05 | 11.05 | 6.87 | 39.10 | 7.14 | 13.43 |
| | All Else | 76.80 | 76.80 | 85.53 | 18.27 | 85.26 | 74.42 |

The total weight parts or percentages of items M-Z for each of the samples 1-6 of Table 2 is 100.00.

Resin blends M, N, O and P are the four resin formulations of Example Set 1; and see e.g., Table 1. The water reducer Q may be a molecular sieve as described in Example Set 1 and tabulated in Table 1 or any of the other known water absorbing, reacting or reducing chemicals. Items R, S, T, U and V are fillers. Key to the ultimate performance of all of these composites is a very high loading of fillers predominantly, but not limited to, solids as is shown in Table 2. Generally, this high loading will be on a weight basis as is illustrated in composites 1, 2, 3, 5 & 6. However, composite 4 shows the other extreme, namely, a filler loading, which, although very low in weight percent, is very high, about 90%, on a volume basis. Any combination high density types. Liquid fillers, although not shown in the table, will have a role as wet out and homogenizing constituents. Any combination of colorants may be used. Items W and X illustrate two organic dyes which might be employed for pigmentation or coloration. Item Y can be any type or combination of ultraviolet absorber and antioxidants. For example, carbon black is very effective for black pigmented systems. Neutral or light colored systems can be stabilized by the addition of blends of designed ingredients such as Ciba Geigy's Tinnwin® UV-absorbers and Irganox® antioxidants. The need for color stabilizers for most indoor applications and for darkly colored outdoor applications will be minimal, if at all. In most cases, only pastel colors under extreme sunlight exposure will require stabilization. Item Z is the common polymeric MDI isocyanate with an equivalent weight of about 133.3 grams per mole and a functionality of about 2.7. However, it is to be understood that this invention may utilize any of the isocyanates available, including aromatic, aliphatic and pseudo-aliphatic species and blends thereof. As previously indicated, the filler package including items Q through Y of Table 2 may be pre-blended or added in sequence.

The preferred manufacturing process is to pre-mix the resins, the fillers and the isocyanates as three distinct master blends. These master blends may be used immediately or stored for later usage. Prior to manufacturing, the resin master blend and the filler master blend are mixed together in the correct proportions and blended to achieve adequate wet-out of all dry ingredients. This intermediary production blend may also be used immediately or stored for subsequent use.

Just prior to production, the intermediary resin and filler blends are mixed in the correct proportions with the isocyanate blend to achieve homogeneity. This final mixing may be done batch-wise or, preferentially, as a continuous in-line stream. This final mixture is then cast into molds and leveled by vibrating, tramping or calendering.

In some cases it may be desirable to utilize a top surface, i.e., glaze coat, which will have superior properties or attributes for specific applications. Examples are a UV and oxidative resistant surface for strong light exposures, a superior abrasion resistant surface for flooring applications, and a translucent depth simulating coating for cosmetic reasons. In these instances, a separately blended polyurethane system may be pre-coated into the mold or subsequently coated on top of the molded article. This glaze coat can be of essentially the same composition as the bulk layer, or it may be a totally different polyurethane system as is described by the composition 6 in Table 2. This glaze coat may be heavily filled, lightly filled or non-filled and may contain colorants and special additives to enhance weathering, frictional properties, abrasion resistance, etc. The hardening time of this glaze coat can be adjusted as required. If it is applied as a pre-coat into the mold, it may be desirable but not necessary to cast the bulk mix before the pre-coat has totally hardened in order to shorten the production time.

CONCLUSIONS

A superior composition and process for manufacturing simulated cementitious, clay and cellulosic type products is provided. Examples of these include simulated ceramic type acoustical panels, roofing overlayments, including Spanish, simulated slate and simulated cedar shake, landscape accessories, including simulated timbers, stepping stones, ground covers, statues, floral planters, tables and seating, architectural panels, fascia and overlayments, roadway directional and information signs, and computer housings. These products are useful for structural, decorative, indoor and outdoor applications. The final product may be of single unit or multi-unit, i.e., sheet, construction and may be of any color, shape, design and texture.

The key to this invention is a highly filled, substantially non-blown polyurethane type structural composite containing readily available, low-cost mineral, polymer and cellulosic fillers. This technology achieves enormous performance advantages over the prior art, including greater flexibility, superior impact, shock and thermal insulation, reduced combustibility, and improved weather resistance. It offers more economical manufacturing, including reductions in breakage, enormous lowering of energy costs, and much greater efficiencies. Also, due to the lower densities, it offers reduced transportation costs, easier handling and installation, and increased freedom of architectural design.

Accordingly, this invention describes an economical method of manufacturing high physical property composites utilizing an substantially solid matrix of polyurethane type polymers with inexpensive and commonly occurring fillers. These final products have cosmetic value which rivals the prior art, economic value which exceeds the prior art, and performance value which vastly exceeds the prior art. The invention achieves product performance which is far greater than a simple sum of the components. The superior results could not have been predicted. In fact, experimentation in this direction was blocked by two far reaching convictions. The first is that, because of the high cost of polyurethanes, the only economical way of utilizing these polymers was to foam them and thereby reduce the cost per unit volume. But this reduces the physical properties and necessitates the inclusion of reinforcing wires, belts, fibers and meshes, e.g., screens, and the final properties are still only good for thermal insulation. The second conviction is that polyurethanes always foam in the presence of wet ingredients and fillers are always wet; therefore, it is impossible to make a solid polyurethane with fillers. The present invention provides a manufacturing method and compositions which are directly opposed to these prior convictions.

The substantially solid composites taught in this invention result in products which have the following properties:

Excellent cosmetics.
Exceptional durability.
Exceptional performance.
Reduced installation requirements.
Easier fabrication.
Inherent fire retardancy.
Inherent mold, rot and weather resistance.
Greater flexibility and resistance to impact cracking.
Reduced densities.
Fewer architectural restraints.
Easier and less energy demanding manufacturing.
Increased production efficiency.
Enhanced thermal insulation properties.
Superior shock absorbing properties.
Superior sound deadening properties.
Reduced breakage.
Lowered shipping and construction costs.
Utility for both indoor and outdoor placements.

Utility for load bearing, structural and decorative applications.

Although the above description contains many specifics, these should not be construed as limiting the scope of the invention but merely as providing illustrations of some of the presently preferred embodiments of this invention. For example, the products may be of varied colors and textures, they may be of any shape or size and, as an additional improvement over the prior art, may have molded-in features such as mechanical locks and fastening devices. Thus, the scope of the invention should be determined by the appended claims and their legal equivalents, rather than by the examples given.

What is claimed is:

1. A composite comprising a mixture having a solid matrix, selected from at least one of the group consisting of a polyurethane, a polyisocyanurate, and a polyurea, with a dry solid particulate or a dry liquid filler, wherein:
   said matrix is substantialy non-foamed;
   said filler is present in an amount from 50 to 95 percent by weight of the composite;
   the composite being rigid, and useful itself as a structural material without a need for an additional strengthening element or reinforcement to achieve or maintain its structural integrity.

2. The composite of claim 1, wherein said filler is said solid.

3. The composite of claim 2, wherein said matrix is the polyurethane.

4. The composite of claim 3, which has a resin tensile strength at least from 5200 to 6200 pounds per square inch and wherein all else besides resin and isocyanate is about from 76.8 to 85.53 weight percent.

5. The composite of claim 1, which varies in thickness from 3/16 inch to 16 inches, in length from 4 inches to 16 feet, and in width from 0.5 of an inch to 8 feet.

6. The composite of claim 5, further having a separate glaze layer thereon.

7. The composite of claim 1, wherein said matrix is made with a polyol component which is a resin blend of any combination of polyesters, polyethers, extenders and cross-linkers resulting in an average hydroxyl number from 200 to 400 and an average functionality from 2.0 to 4.0, and an isocyanate component having an NCO index from 90 to 300.

8. The composite of claim 7, wherein said filler is a single filler blend of different fillers of varying compositions and sizes or a blend of the same filler but of different configurations and sizes.

9. The composite of claim 8, wherein said matrix is made with a component which is an isocyanate selected from at least one of the group consisting of an aromatic isocyanate, an aliphatic isocyanate and a pseudoaliphatic isocyanate.

10. The composite of claim 9, wherein at least one water reducer is employed to make the same.

11. The composite of claim 6, wherein said glaze layer is of the same material as is said matrix.

12. The composite of claim 10, which further contains at least one member of the group consisting of liquid fillers, plasticizers, ultra-violet absorbers, antioxidants, friction modifiers, abrasion enhancers, fungicides, and colorants, selected from the group consisting of mineral pigments and organic dyes.

13. The composite of claim 3, which has a resin Shore D hardness from $7^7$ to 85, a resin tensile strength at least from 5200 to 6200 pounds per square inch, and a resin notched Izod impact at least from 1.0 to 2.5 pli, and which is formed into a simulated ceramic tile, slate, adobe tile, cedar shake shingle, or landscape timber.

14. The composite of claim 6, wherein said glaze layer is of a different material selected from at least one of the group consisting of a polyurethane, a polyisocyanate, and a polyurea than that of said matrix.

15. The composite of claim 6, wherein said glaze layer is not only of a different material selected from at least one of the group consisting of a polyurethane, a polyisocyanurate, and a polyurea than that of said matrix, but is also a different polymer than is said matrix.

16. The composite of claim 6, wherein said glaze layer further containing at least one member selected from the group consisting of friction and abrasion modifiers, and fungicides.

* * * * *